(No Model.)
T. DOUGHERTY.
KINDERGARTEN APPARATUS FOR TEACHING SPELLING, &c.
No. 366,821. Patented July 19, 1887.
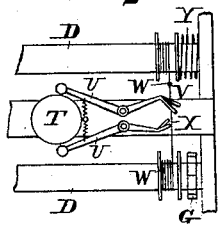
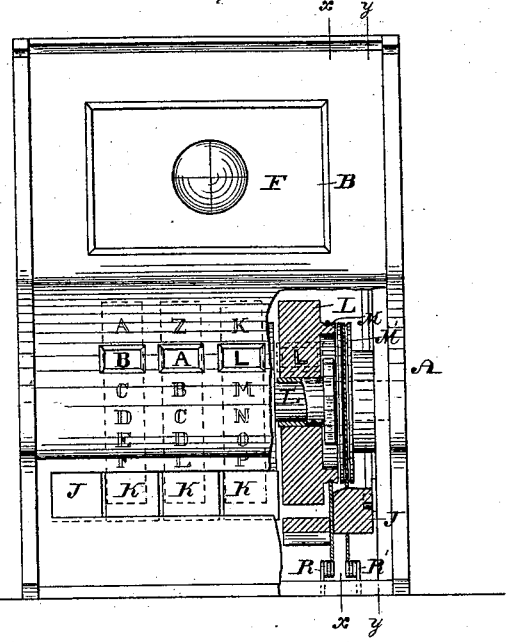
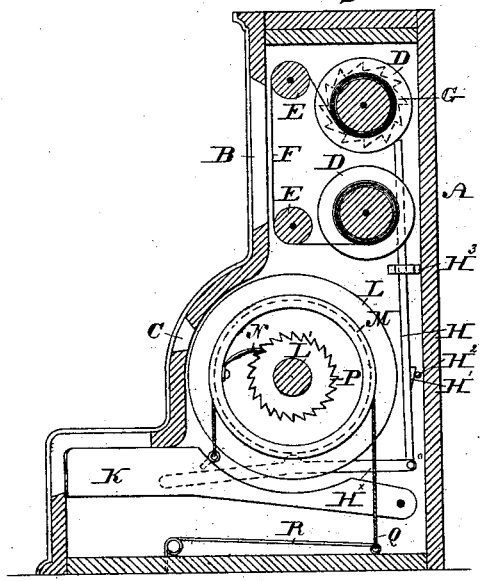
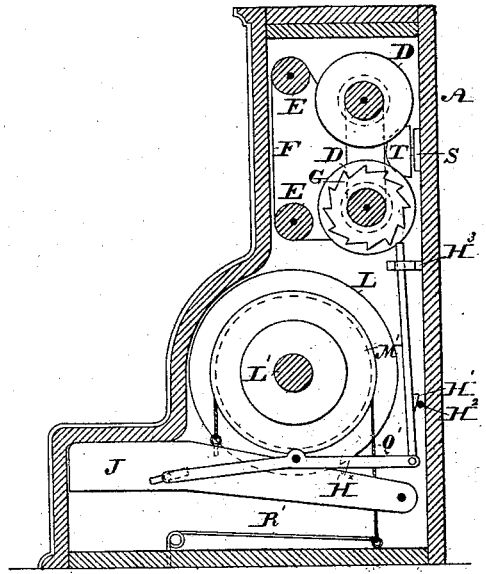
WITNESSES:
Th. Rolle.
A. P. Grant.
INVENTOR
Tiberias Dougherty
BY John A. Wiederstein
ATTORNEY.

UNITED STATES PATENT OFFICE.

TIBERIAS DOUGHERTY, OF PHILADELPHIA, PENNSYLVANIA, ASSIGNOR OF ONE-HALF TO GEORGE H. CLARKSON, OF SAME PLACE.

KINDERGARTEN APPARATUS FOR TEACHING SPELLING, &c.

SPECIFICATION forming part of Letters Patent No. 366,821, dated July 19, 1887.

Application filed December 21, 1886. Serial No. 222,162. (No model.)

*To all whom it may concern:*

Be it known that I, TIBERIAS DOUGHERTY, a citizen of the United States, residing in the city and county of Philadelphia, State of Pennsylvania, have invented a new and useful Improvement in Apparatus for Teaching Kindergarten Studies, which improvement is fully set forth in the following specification and accompany drawings, in which—

Figure 1 represents a partial front view and partial vertical section of an apparatus for teaching kindergarten studies embodying my invention. Figs. 2 and 3 represent vertical sections thereof, respectively in lines $x\,x$ and $y\,y$, Fig. 1. Fig. 4 represents a view of mechanism thereof on a reduced scale.

Similar letters of reference indicate corresponding parts in the several figures.

My invention consists of an apparatus for teaching kindergarten studies embodying the representation of objects or subjects and letters of the alphabet, whereby a learner may form the word or name of said object or subject, and thus readily acquire the art of spelling.

It further consists of means for indicating the termination of the apron which carries the object-lesson, so that further operation of said apron and consequent tearing of the same is prevented.

Referring to the drawings, A represents a casing having in front an opening, B, and a series of openings, C. Within the casing are mounted the drums D and rollers E, the drums and rollers being located, respectively, one above the other.

F represents an apron or sheet, which is passed around the rollers E and has its ends connected with the drums D D, the location of the drums, rollers, and apron being such that the portion of the apron that passes from one roller to the other is seen at the opening B. Connected with each drum is a ratchet, G, and engaging with each ratchet is a pawl, H, the ratchet of one drum being at the end opposite to that of the other drum, the operating-pawls being vertically guided at opposite sides of the casing A, and pivoted at their lower ends to levers $H^x$, which are pivoted to the casing A and engaged by keys J J, the latter being pivoted to the casing A, and appearing at the front thereof. A series of keys, K, are also pivoted to the casing A and located between the end keys, J J, said keys J J K forming a bank, which may be readily operated by a learner or scholar.

A number of drums, L, are freely mounted on a horizontal axis or shaft, L′, the latter being located below the apron F and secured to the casing A, the peripheries of said drums appearing at the openings C of the casing.

Connected with the side of each drum is a pulley, M, and a pawl, N, the latter engaging with a ratchet, P, which is secured to the shaft L′.

Passing around each pulley M is a cord, Q, one end of each of which is secured to a key, K, and the other end is connected with a spring, R, which is attached to the casing A. Pulleys M′ are freely mounted on the shaft L′, and have passed around them cords Q′, which are attached to the keys J J and springs R′, the latter being properly connected with the casing.

Attached to a cross-bar, S, on the frame adjacent to the drums D is a gong or bell, T, and mounted on said bar are two bell-hammers, U, which are on opposite sides of said bell. The heel ends of the hammers U are bifurcated, as at V, so as to be engaged by stops or abutments W, secured to a cord, X, the latter being attached to the drums D.

Friction-springs Y are interposed between the heads of the drums D and the sides of the casing A, for preventing improper motions of said drums. The apron F has printed, painted, or otherwise marked on it a number of figures or objects, and the drums L have on their peripheries the letters of the alphabet. Now, when the apron is to be moved in order to present a figure or object which can be seen at the opening B, either of the keys J J are depressed by the teacher. This operates the respective lever $H^x$ and pawl H, and causes the latter to engage with the proper ratchet G, thus rotating the drum D, with which said ratchet is connected, it being noticed that by the operation of the two drums D motion may be imparted to the sheet F in opposite directions. When a key J is depressed, the cord Q′ follows the same and moves around the pulley M' and raises the spring R'. When the key is let go, the spring restores the key to its normal position, the pawl being also lowered and cleared of the ratchet G. The scholar or learner is now required to spell the word or name of the figure or object on the apron F, in the present case that of a ball. For this purpose the keys K are successively operated until the letters "B A L L" appear, respectively, at the openings C, and thus the word is formed. When a key K is depressed, the cord Q rotates the pulley M, and with it the alphabet-drum L. The pawl N moves with said pulley or drum and engages with the ratchet P, whereby return motion of the drum is prevented. When the key is let go, the spring R is inoperative, and the former is returned to its first position, the cord Q sliding over the pulley M, the latter being held by the ratchet and pawl, as has been stated. Owing to the tension on the cord by said spring, forward motion of the drum is prevented, and thus the latter remains stationary until the key is again depressed.

During the operation of the apron F, when the end of the same is about to be reached, one of the stops W of the cord X enters the bifurcation V of the bell-hammer and engages therewith, thus drawing back said hammer, and as the cord continues its motion the stop clears the bifurcation and the hammer is released, whereby the bell is struck, thus indicating the end of the apron.

Attached to the pawls H are deflectors H', having inclined outer faces, and secured to the casings A, and adapted to be in contact with the said deflectors, are pins or bearing-pieces H². Also secured to the casing are guides H³, in which the said pawls H play. The said deflectors H' are of such length and are so secured to the pawl H that when the said pawl is in its lowest position the upper face or squared end of the deflector is above the pin H², so that there is no liability of it being caught thereby, and thus render inoperative the device.

In operation, when one of the keys is pressed so that its pawl rises, the upper end thereof comes in contact with the teeth of the ratchet and is slightly pushed outward from the center of said wheel, or toward the casing, this outward movement being readily permitted, owing to the inclined face of the deflector, the said deflector being kept, however, in contact with the pin. When the pawl descends, the upper end thereof, owing to the action of the pin upon the deflector, while being lowered is at the same time pushed from the casing to a position more nearly under the wheel, so as to readily engage with the teeth of the same on the next upward movement of the said pawl. The openings or slots on the guide H³ are of greater width than the pawls, so as to permit the backward and forward play of the pawl therein.

When a scholar is required to spell without reference to the figure or object, the apron or sheet is not necessarily used.

Having thus described my invention, what I claim as new, and desire to secure by Letters Patent, is—

1. An apparatus for teaching having rollers and drums carrying an endless apron, ratchets on said drums, pawls for operating said ratchets, levers pivoted to said pawls, and keys for operating said levers, the said pawls having the deflectors H', and the walls of the casing having secured thereto the pins or bearings H², and the guides H³, the parts being combined and operating substantially as described.

2. In an apparatus for teaching, the combination of the casing A, with opening C, the shaft L', having ratchet P, the drums L, having pulleys M, with pawl N, and means, substantially as described, to operate said pulleys, all substantially as described.

3. In a teaching apparatus, a drum, a pulley, a cord passing around the same, and a key and spring combined, substantially as described, said key and spring being connected with opposite ends of said cord, whereby said cord operates the drum or pulley and afterward creates friction thereon, as stated.

4. The sheet F and drums D, in combination with the cord X, stops W, a bell, and bell-hammer, the latter having its heel ends adapted to be engaged by said stops, substantially as described.

TIBERIAS DOUGHERTY.

Witnesses:
JOHN A. WIEDERSHEIM,
A. P. GRANT.